US011641993B2

(12) United States Patent
Choi et al.

(10) Patent No.: US 11,641,993 B2
(45) Date of Patent: May 9, 2023

(54) DEVICE FOR REDUCING USER-SENSED WEIGHT OF WIRELESS VACUUM CLEANER

(71) Applicants: Jae Young Choi, Seoul (KR); Ji Na Park, Seoul (KR)

(72) Inventors: Jae Young Choi, Seoul (KR); Ji Na Park, Seoul (KR); Min Seung Choi, Seoul (KR)

(73) Assignees: Jae Young Choi, Seoul (KR); Ji Na Park, Seoul (KR)

( * ) Notice: Subject to any disclaimer, the term of this patent is extended or adjusted under 35 U.S.C. 154(b) by 377 days.

(21) Appl. No.: 16/985,573

(22) Filed: Aug. 5, 2020

(65) Prior Publication Data

US 2021/0038039 A1 Feb. 11, 2021

(30) Foreign Application Priority Data

Aug. 5, 2019 (KR) .................. 10-2019-0094673

(51) Int. Cl.
*A47L 9/22* (2006.01)
*H02K 11/00* (2016.01)
*A47L 9/28* (2006.01)
*H02K 7/116* (2006.01)
*G05D 3/00* (2006.01)
*F16M 13/00* (2006.01)
*A47L 5/24* (2006.01)

(52) U.S. Cl.
CPC ............ *A47L 9/22* (2013.01); *A47L 9/2884* (2013.01); *A47L 9/2889* (2013.01); *F16M 13/005* (2013.01); *G05D 3/00* (2013.01); *H02K 7/116* (2013.01); *H02K 11/0094* (2013.01); *A47L 5/24* (2013.01)

(58) Field of Classification Search
None
See application file for complete search history.

(56) References Cited

U.S. PATENT DOCUMENTS

| 6,668,846 | B2 | 12/2003 | Meador |
| 10,433,688 | B2 | 10/2019 | Nam et al. |
| 10,561,287 | B2 | 2/2020 | Nam et al. |
| 10,568,474 | B2 | 2/2020 | Nam et al. |
| 10,568,475 | B2 | 2/2020 | Nam et al. |
| 10,568,476 | B2 | 2/2020 | Nam et al. |
| 10,575,689 | B2 | 3/2020 | Nam et al. |

(Continued)

FOREIGN PATENT DOCUMENTS

| GB | 2255152 A | * 10/1992 | ............... F03G 3/08 |
| JP | 6259966 B | 1/2018 | |

(Continued)

*Primary Examiner* — Monica S Carter
*Assistant Examiner* — Dana Lee Poon
(74) *Attorney, Agent, or Firm* — Hauptman Ham, LLP

(57) ABSTRACT

Disclosed is a device for reducing a user-sensed weight of a wireless vacuum cleaner including a suctioning pipe and a suction motor disposed on a top of the suctioning pipe, the device comprising: a case disposed adjacent to the suction motor and having a space defined therein, and a rotatable assembly received in the space, wherein the rotatable assembly receives therein a motor and a battery, wherein the rotatable assembly is configured to rotate clockwise or counter-clockwise when the motor is activated.

9 Claims, 11 Drawing Sheets

(56) References Cited

U.S. PATENT DOCUMENTS

| | | |
|---|---|---|
| 10,582,821 B2 | 3/2020 | Nam et al. |
| 10,617,269 B2 | 4/2020 | Nam et al. |
| 10,617,270 B2 | 4/2020 | Nam et al. |
| 10,631,698 B2 | 4/2020 | Nam et al. |
| 10,646,082 B2 | 5/2020 | Nam et al. |
| 10,646,806 B2 | 5/2020 | Nam et al. |
| 2002/0153185 A1* | 10/2002 | Song ................ A47L 9/2894 180/167 |
| 2003/0089389 A1* | 5/2003 | Meador ................ A61H 3/02 135/65 |
| 2004/0107528 A1* | 6/2004 | LeClear ................ A47L 5/38 15/313 |
| 2004/0207726 A1 | 10/2004 | McCutchen |
| 2006/0069463 A1 | 3/2006 | Kim |
| 2017/0280950 A1* | 10/2017 | Nam ................ A47L 9/149 |
| 2018/0333030 A1 | 11/2018 | Nam et al. |
| 2019/0101132 A1 | 4/2019 | Fujiwara et al. |
| 2019/0133389 A1 | 5/2019 | Nam et al. |
| 2019/0133390 A1 | 5/2019 | Nam et al. |
| 2020/0008637 A1 | 1/2020 | Nam et al. |
| 2020/0113399 A1 | 4/2020 | Nam et al. |
| 2020/0121143 A1 | 4/2020 | Nam et al. |
| 2020/0129019 A1 | 4/2020 | Nam et al. |
| 2020/0163511 A1 | 5/2020 | Nam et al. |
| 2020/0163512 A1 | 5/2020 | Nam et al. |
| 2020/0163513 A1 | 5/2020 | Nam et al. |
| 2020/0186004 A1* | 6/2020 | Kim ................ A47L 5/24 |

FOREIGN PATENT DOCUMENTS

| | | | |
|---|---|---|---|
| KR | 10-2006-0028293 A | | 3/2006 |
| KR | 10-2015-0059064 A | | 5/2015 |
| KR | 1020190016739 A | * | 8/2017 |
| KR | 10-2017-0112853 A | | 10/2017 |
| KR | 20-2018-0000143 U | | 1/2018 |
| KR | 10-2019-0016739 A | | 2/2019 |

* cited by examiner (a)

(b)

(a)

(b)

(a)

(b)

DEVICE FOR REDUCING USER-SENSED WEIGHT OF WIRELESS VACUUM CLEANER

CROSS-REFERENCE TO RELATED APPLICATION

This application is based on and claims priority under 35 U.S.C. § 119 to Korean Patent Application No. 10-2019-0094673 filed on Aug. 5, 2019, on the Korean Intellectual Property Office, the entire disclosure of which is incorporated herein by reference.

BACKGROUND

1. Field

Embodiments of the present disclosure relate to a user-sensed weight reduction device to reduce a user-sensed weight of a wireless vacuum cleaner to increase user convenience and to receive therein a battery that stores power to be provided to the wireless vacuum cleaner.

2. Description of Related Art

A vacuum cleaner is a device that removes external dust or foreign substances by using a vacuum suction pressure. The vacuum cleaner may be classified into a wired vacuum cleaner in which a suction motor is driven when inserting a plug into an outlet and a wireless vacuum cleaner in which a suction motor is driven with power stored in a battery. In particular, as a battery technology develops, the wireless vacuum cleaner has been recently used.

FIG. 1 shows that a user uses the wireless vacuum cleaner.

Referring to FIG. 1, the user performs cleaning using the wireless vacuum cleaner. A handle 110 and a suction motor 120 constitute an upper portion of the wireless vacuum cleaner. A suctioning pipe 130 is connected thereto.

However, since both the handle 110 and the suction motor 120 are connected to a top of the suctioning pipe 130, increase in a user-sensed weight of the cleaner due to a gravity acting on the suction motor 120 causes the user to use a lot of energy to hold the wireless vacuum cleaner. This causes inconvenience to the user of the wireless vacuum cleaner.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a device for reducing a user-sensed weight of a wireless vacuum cleaner to increase a user's convenience, in which a user-sensed weight of a body of the wireless vacuum cleaner is reduced.

Moreover, another purpose of the present disclosure is to provide a user-sensed weight reduction device that may accommodate therein multiple large-capacity batteries for long-term use of the wireless vacuum cleaner.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a device for reducing a user-sensed weight of a wireless vacuum cleaner including a suctioning pipe and a suction motor disposed on a top of the suctioning pipe, the device comprising: a case having a first through-hole defined in a central region of the case through which the suctioning pipe passes and a first space defined in a non-central region of the case, and disposed adjacent to the suction motor; and a rotatable assembly received in the first space and having a second through-hole, M first receiving holes and N second receiving hole, wherein the second through-hole is defined in a central region of the rotatable assembly, the M first receiving holes and the N second receiving holes are defined in a non-central region of the rotatable assembly and each of M and N is an integer of 1 or greater, wherein each of M motors is received in each of the M first receiving holes, wherein each of N batteries is received in each of the N second receiving holes, and wherein the rotatable assembly is configured to rotate clockwise or counter-clockwise when the M motors are activated.

In one implementation of the first aspect, an angular momentum occurs due to the rotation of the rotatable assembly, such that a user-sensed weight of a top portion of the wireless vacuum cleaner is reduced due to the generated angular momentum.

In one implementation of the first aspect, the case includes: a bottom defining a bottom face of the case and having a hollow central region; a cover defining a top face of the case and having a hollow central region; a side wall disposed between the bottom and the cover, wherein the first space is defined by an outer face of the first through-hole, a top face of the bottom, a bottom face of the cover, and an inner face of the side wall.

In one implementation of the first aspect, the device further comprises: a first gear disposed on one of a top and a bottom of an outer face of the first through-hole; and M second gears disposed in the M first receiving holes respectively, wherein the M second gears are flush with the first gear, wherein each of the M second gears is rotatably coupled to a drive shaft of each of the M motors, wherein each shaft is flush with each second gear, wherein the first gear is engaged with the M second gears, wherein when each of the M second gears rotates around the first gear, the rotatable assembly rotates.

In one implementation of the first aspect, the rotatable assembly has M grooves defined in an inner face thereof, wherein the M grooves communicate with the M first receiving holes, respectively, wherein a portion of each of the M second gears protrudes through each of the M grooves out of the assembly and is engaged with the first gear.

In one implementation of the first aspect, the device further comprises at least one bearing having one face in contact with the inner face of the rotatable assembly, and an opposite face contacting an outer face of the first through-hole.

In one implementation of the first aspect, the device further comprises at least one first metal plate, wherein one end of the first metal plate is electrically connected to an electrode of a first battery of the batteries, and the other end of the first metal plate is electrically connected to an electrode of a second battery adjacent to the first battery, wherein the electrode of the first battery and the electrode of the second battery are flush with each other.

In one implementation of the first aspect, a polarity of the electrode of the first battery and a polarity of the electrode of the second battery are opposite to each other.

In one implementation of the first aspect, the device further comprises: a second metal plate disposed adjacent to a first one of the N second receiving holes; and a third metal plate disposed adjacent to a last one of the N second receiving holes, wherein the at least one bearing includes: a first bearing made of a conductive material and disposed on a top of the outer face of the first through-hole; and a second bearing made of a conductive material and disposed on a bottom of the outer face of the first through-hole, wherein one end of the second metal plate is electrically connected to the first bearing, and the other end of the second metal plate is connected to a bottom electrode of a battery inserted in the first one of the N second receiving holes, wherein one end of the third metal plate is electrically connected to the second bearing, and the other end of the third metal plate is connected to a top electrode of the battery inserted in the last one.

A second aspect of the present disclosure provides a device for reducing a user-sensed weight of a wireless vacuum cleaner including a suctioning pipe and a suction motor disposed on a top of the suctioning pipe, the device comprising: a case disposed adjacent to the suction motor and having a first space defined in the case; and a rotatable assembly received in the first space, and having a first receiving hole and at least one second receiving hole, wherein the first receiving hole is defined in a central region of the rotatable assembly and the at least one second receiving hole is defined in a non-central region of the rotatable assembly, wherein the first receiving hole receives a motor, wherein the at least one second receiving hole receives at least one battery, wherein when the motor is activated, the rotatable assembly is configured to rotate clockwise or counter-clockwise.

In one implementation of the second aspect, an angular momentum occurs due to the rotation of the rotatable assembly, such that a user-sensed weight of a top portion of the wireless vacuum cleaner is reduced due to the generated angular momentum.

In one implementation of the second aspect, a drive shaft of the motor is formed on one of a top and a bottom of the motor, wherein the rotatable assembly has a first face flush with the shaft and connected to the shaft, such that the rotatable assembly is rotated when the motor is activated.

In one implementation of the second aspect, the motor does not extend through an entirety of a vertical length of the first receiving hole, wherein each battery extends through an entirety of a vertical length of each second receiving hole, wherein the first face of the rotatable assembly has a connection hole defined therein through which the shaft of the motor passes, wherein in the connection hole, the shaft of the motor is coupled to the first face of the rotatable assembly.

In one implementation of the second aspect, the device further comprises at least one bearing having one face in contact with an outer face of the motor, and an opposite face contacting an inner face of the first receiving hole.

In one implementation of the second aspect, the device further comprises at least one first metal plate, wherein one end of the first metal plate is electrically connected to an electrode of a first battery of the batteries, and the other end of the first metal plate is electrically connected to an electrode of a second battery adjacent to the first battery, wherein the electrode of the first battery and the electrode of the second battery are flush with each other.

In one implementation of the second aspect, a polarity of the electrode of the first battery and a polarity of the electrode of the second battery are opposite to each other.

In one implementation of the second aspect, the device further comprises: a second metal plate disposed adjacent to a first one of the second receiving holes; and a third metal plate disposed adjacent to a last one of the second receiving holes, wherein the at least one bearing includes: a first bearing made of a conductive material and disposed on a top of the outer face of the first receiving hole; and a second bearing made of a conductive material and disposed on a bottom of the outer face of the first receiving hole, wherein one end of the second metal plate is electrically connected to the first bearing, and the other end of the second metal plate is connected to a bottom electrode of a battery inserted in the first one of the second receiving holes, wherein one end of the third metal plate is electrically connected to the second bearing, and the other end of the third metal plate is connected to a top electrode of the battery inserted in the last one.

A third aspect of the present disclosure provides a device for reducing a user-sensed weight of a wireless vacuum cleaner including a suctioning pipe and a suction motor disposed on a top of the suctioning pipe, the device comprising: a case disposed adjacent to the suction motor and having a space defined therein; and a rotatable assembly received in the space, wherein the rotatable assembly receives therein a motor and a battery, wherein the rotatable assembly is configured to rotate clockwise or counter-clockwise when the motor is activated.

Effects in accordance with the present disclosure may be as follows but may not be limited thereto.

According to the present disclosure, there is an advantage of increasing user convenience by reducing the user-sensed weight of an upper portion of the wireless vacuum cleaner.

Moreover, according to the present disclosure, there is an advantage of using the wireless vacuum cleaner for a long time by storing a large number of large capacity batteries of the wireless vacuum cleaner.

Moreover, the effect of the present disclosure is not limited to the above effects. It should be understood to include all possible effects derived from descriptions of the present disclosure or a configuration as set forth in the claims.

DETAILED DESCRIPTIONS

Figure 1:
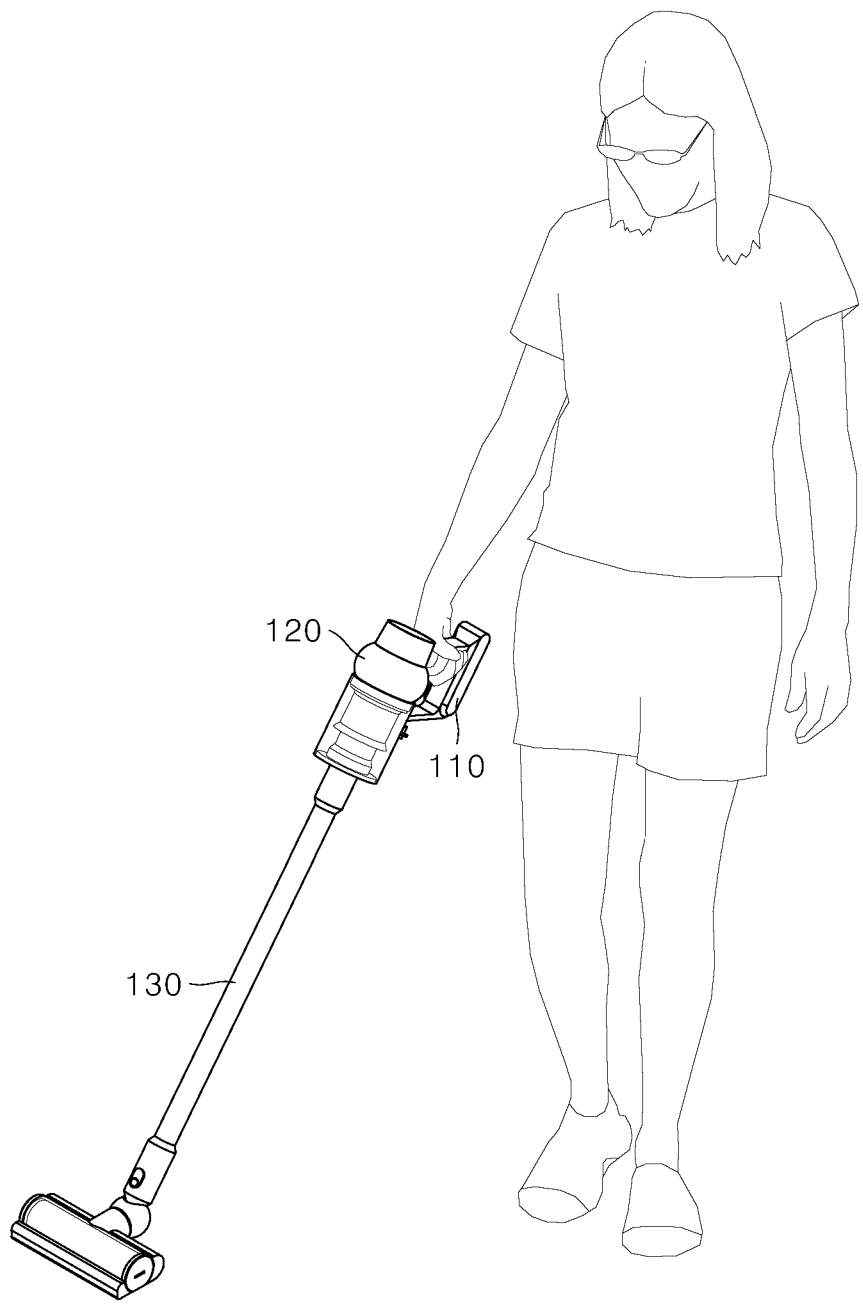
FIG. 1 shows a state in which a user uses a wireless vacuum cleaner.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Moreover, in implementing the present disclosure, a component may be subdivided for convenience of description. However, sub-components may be implemented in one unit or module. Alternatively, one component may be divided into multiple units or modules.

Figure 2:
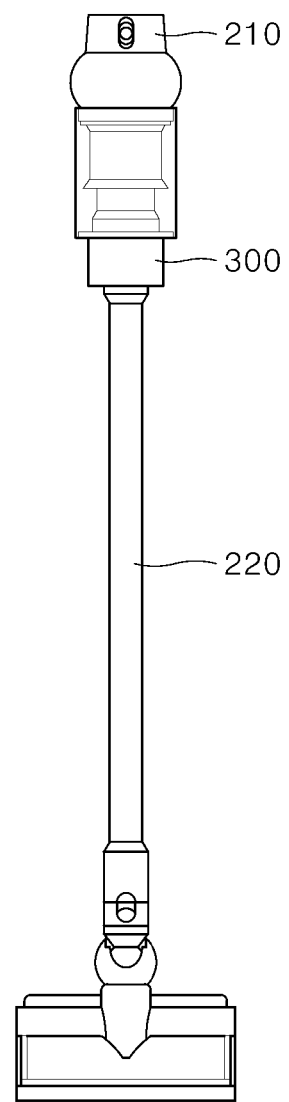
FIG. 2 is a view showing a state in which a user-sensed weight reduction device according to a first embodiment of the present disclosure is attached to a wireless vacuum cleaner.
Figure 3:
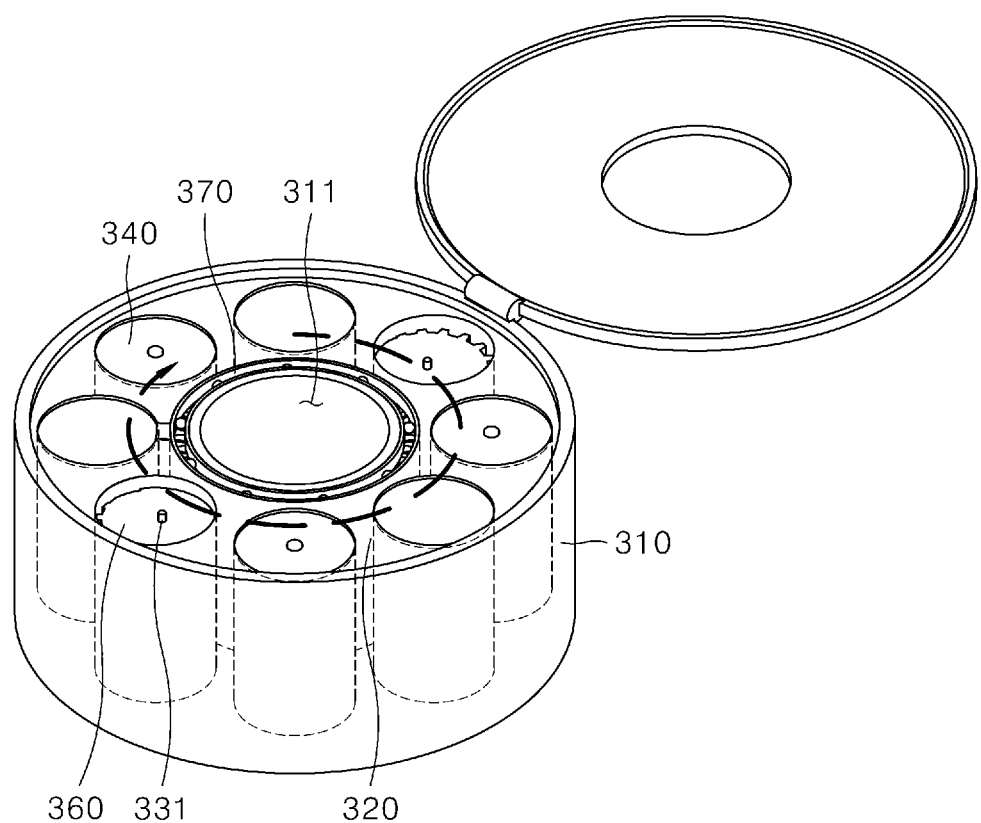
FIG. 3 is a perspective view of a user-sensed weight reduction device according to the first embodiment of the present disclosure.
Figure 4:
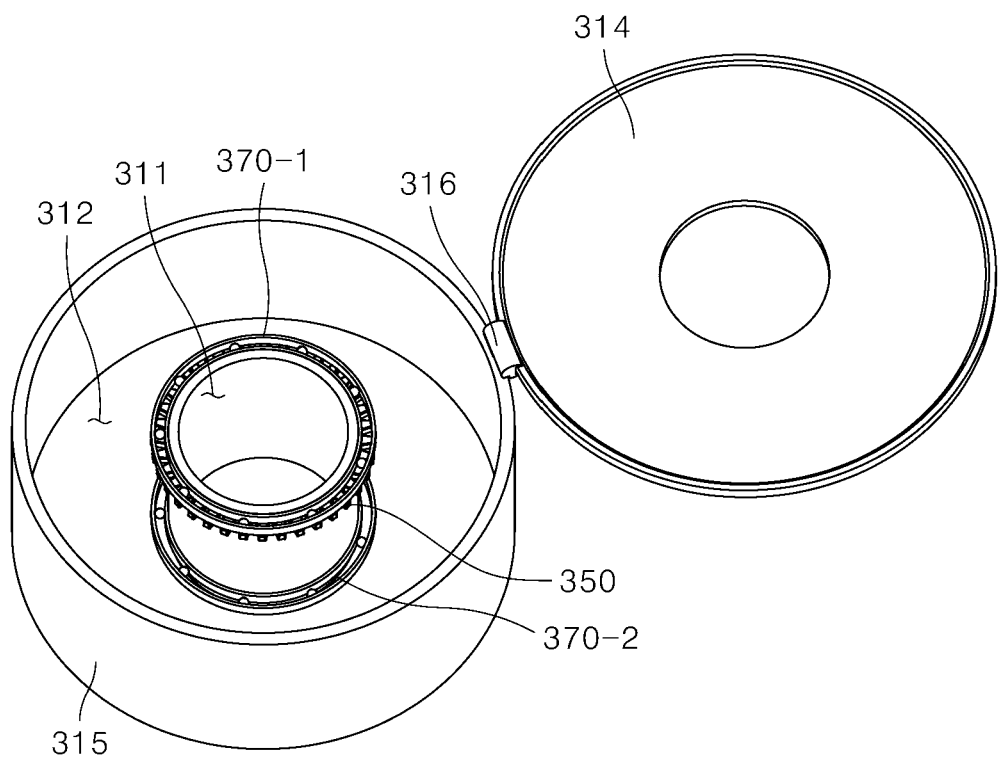
FIG. 4 shows a shape of a case of the device to reduce the user-sensed weight of the wireless vacuum cleaner in FIG. 3.
Figure 4:
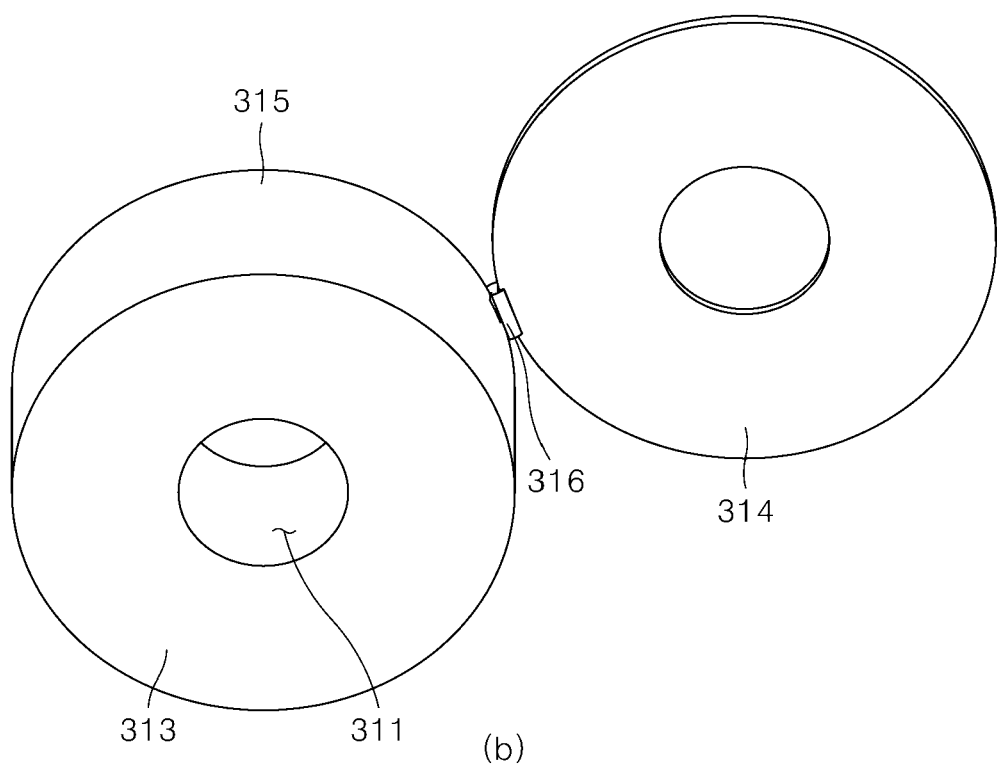
Figure 5:
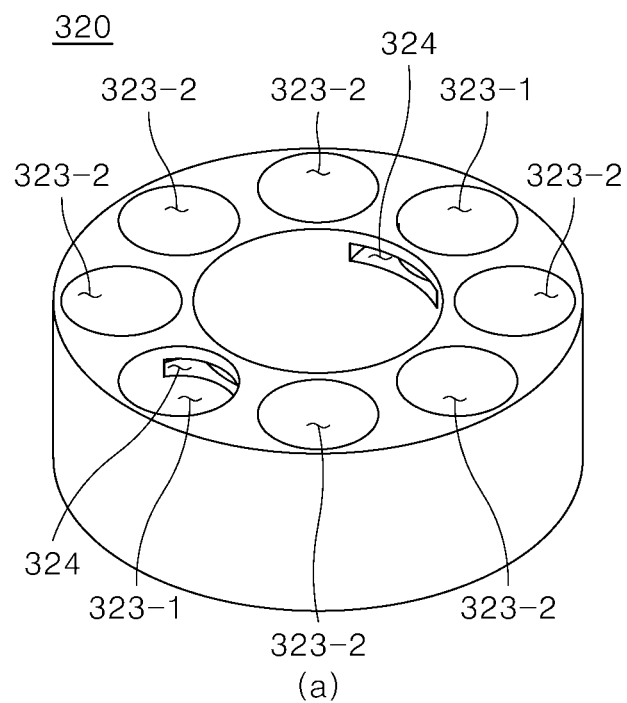
FIG. 5 shows a shape of a rotatable assembly of the device for reducing the user-sensed weight of the wireless vacuum cleaner in FIG. 3.
Figure 5:
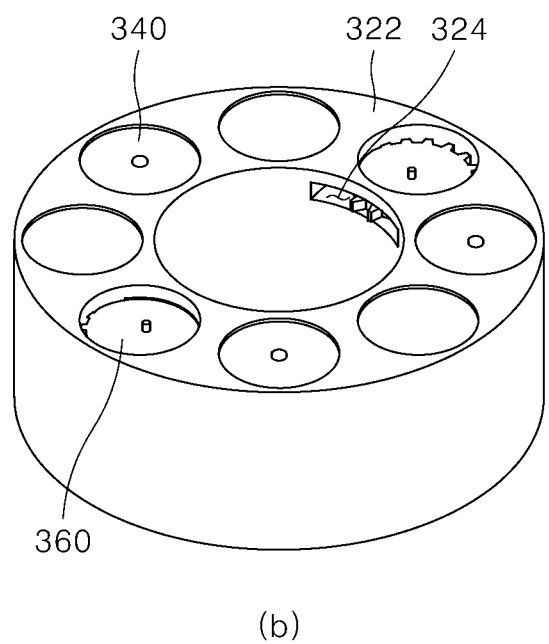
Figure 6:
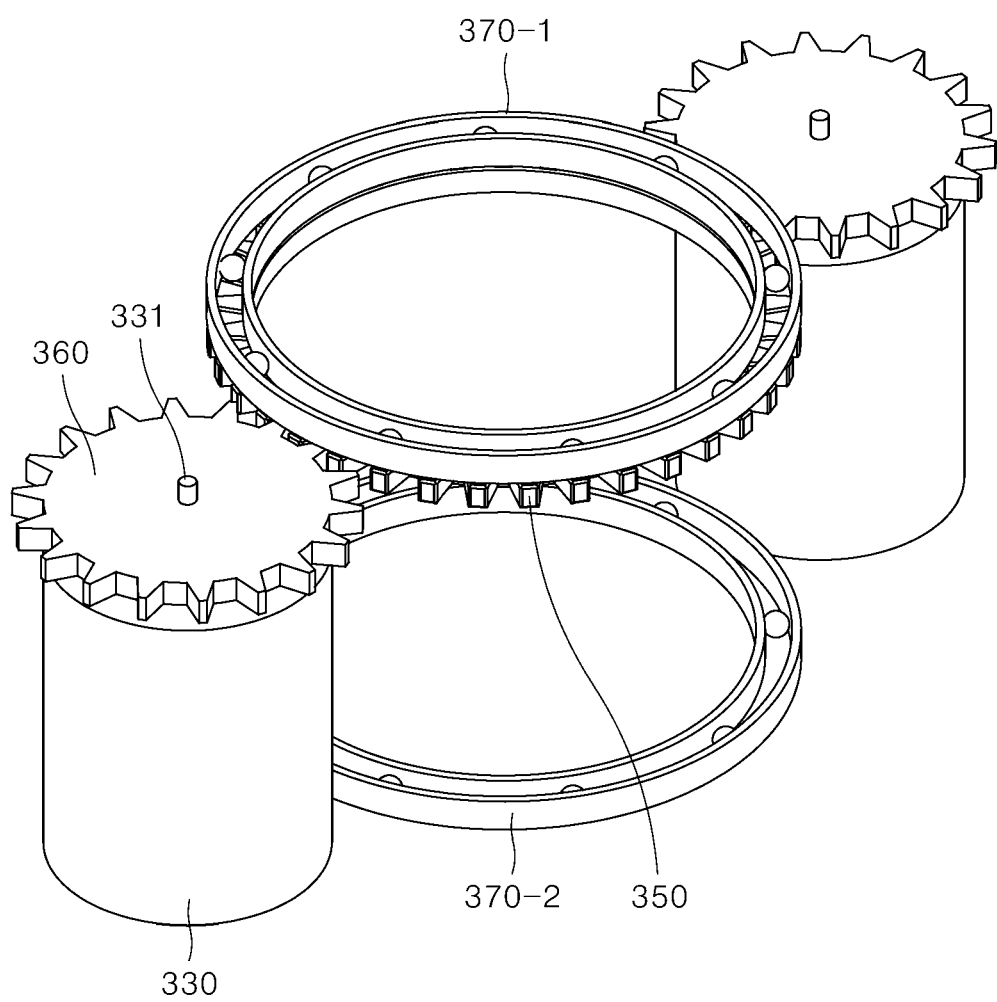
FIG. 6 is a diagram showing a detailed structure and an arrangement structure of a first gear, a second gear and a bearing of the device for reducing the user-sensed weight of the wireless vacuum cleaner FIG. 3.

FIG. 2 is a view showing a state in which a user-sensed weight reduction device according to a first embodiment of the present disclosure is attached to a wireless vacuum cleaner. FIG. 3 is a perspective view of a user-sensed weight reduction device according to the first embodiment of the present disclosure. FIG. 4 shows a shape of a case of the device to reduce the user-sensed weight of the wireless vacuum cleaner in FIG. 3. FIG. 5 shows a shape of a rotatable assembly of the device for reducing the user-sensed weight of the wireless vacuum cleaner in FIG. 3. FIG. 6 is a diagram showing a detailed structure and an arrangement structure of a first gear, a second gear and a bearing of the device for reducing the user-sensed weight of the wireless vacuum cleaner FIG. 3.

A user-sensed weight reduction device 300 according to a first embodiment of the present disclosure may be received in a wireless vacuum cleaner in which a suction motor 210 for vacuum cleaning is connected to a top of a suctioning pipe 220 as shown in FIG. 2. In this connection, the user-sensed weight reduction device 300 may be installed on a top of an outer face of the suctioning pipe 220.

The user-sensed weight reduction device 300 is configured to reduce a user-sensed weight of a head portion as a top portion of the wireless vacuum cleaner, that is, a portion containing the suction motor 210.

Referring to FIG. 3 to FIG. 6, the user-sensed weight reduction device 300 may include a case 310, a rotatable assembly 320, M (an integer of 1 or greater) motors 330, N (an integer of 1 or greater) batteries 340, a first gear 350, M (an integer of 1 or greater) second gears 360 and at least one bearing 370.

Hereinafter, a configuration of the user-sensed weight reduction device 300 will be described in detail with reference to FIG. 3 to FIG. 6.

The case 310 is disposed adjacent to the suction motor 210 as shown in FIG. 2, and is disposed on a top of an outer face of the suctioning pipe 220.

In FIG. 3 and FIG. 4, the case 310 is illustrated as having a circular shape, but the present disclosure is not limited thereto. The case 310 may have various shapes.

The case 310 protects other components of the user-sensed weight reduction device 300. A first through-hole 311 through which the suctioning pipe 220 passes is formed in a center of the case 310. A first space 312 is formed in and along a non-central region, that is, an outer edge of the case 310.

In particular, referring to FIG. 4, the case 310 includes a bottom 313, a cover 314 and a side wall 315.

The bottom 313 defines a bottom face of the case 310. A central portion thereof has the first through-hole 311 defined therein. The cover 314 defines a top face of the case 310. A central portion thereof has the first through-hole 311 defined therein.

The side wall 315 is disposed between the bottom 313 and the cover 314 and connects the bottom 313 and the cover 314 to each other. In this connection, the bottom 313 and the side wall 315 may be integrally formed with each other. The cover 314 may be connected to the side wall 315 via a hinge 316. Thus, the cover 314 may be opened or closed via the hinge 316.

In one example, the first space 312 is defined by an outer face of the first through-hole 311, a top face of the bottom 312, a bottom face of the cover 314, and an inner face of the side wall 315.

The rotatable assembly 320 is inserted and disposed in the first space 312, and functions to accommodate therein the M motors 330 and the N batteries 340, and is rotatable clockwise or counter-clockwise.

In particular, referring to FIG. 5, the rotatable assembly 320 may have a shape similar to a donut. That is, a second through-hole 321 is formed in a central portion of the rotatable assembly 320. A non-central region thereof defines a accommodation structure 322 inserted into the first space 312. In the accommodation structure 322, a plurality of receiving holes 323 are formed.

The second through-hole 321 has a larger diameter than that of the first through-hole 311, and surrounds the first through-hole 311.

Each of the plurality of receiving holes 323 has a shape in which both an inlet and an outlet are open and thus is a through-hole. The plurality of receiving holes 323 may have the same shape or may have different shapes. The M motors 330 and the N batteries 340 are respectively inserted into the plurality of receiving holes 323.

Hereinafter, each of M receiving holes 323 into which M motors 330 are respectively inserted will be referred to as a first receiving hole 323-1. Each of N receiving holes 323 into which the N batteries 340 are respectively inserted will be referred to as a second receiving hole 323-2.

Each of the M motors 330 generates power to rotate the rotatable assembly 320. Each drive shaft 331 of each motor 330 is connected to a top of each motor 330. A vertical dimension of the motor 330 excluding the drive shaft 331 may be smaller than a vertical dimension of the first receiving hole 322.

Each of the N batteries 340 stores power for charging a main battery inside the wireless vacuum cleaner. Moreover, the M motors 330 may be driven using power stored in the N batteries 340.

In one example, an electrode of (+) polarity is formed at one end of the battery 340, and an electrode having a polarity of (−) is formed at the other end of the battery 340. An arrangement of two batteries 340 adjacent to each other may be configured such that the N batteries 340 is connected to each other in series.

For example, when one end of a battery A acts as a top end, and the other end of the battery A acts as a bottom end. One end of a battery B adjacent to the battery A acts as a bottom end, and the other end of the battery B acts as a top end.

The first gear 350 and the M second gears 360 serve to rotate the rotatable assembly 320.

In particular, referring to FIG. 3, FIG. 4, and FIG. 6, the first gear 350 is fixedly disposed in a top of the first through-hole 311. The central portion of the first gear 350 is hollow. A serrated structure is formed at a non-central region, that is, an outer edge thereof.

Each of the M second gear 360 is disposed in a top of each of M first receiving holes 323-1.

More specifically, the second gear 360 is disposed on a top of the corresponding motor 330 and is connected to the drive shaft 331 of the motor 330 and thus rotates. A hole is formed in a center of the second gear 360. A serrated structure is formed at a non-central region, that is, an outer edge of the second gear 360. The drive shaft 331 is inserted into the hole of the second gear 360. Accordingly, the second gear 360 and the drive shaft 331 are connected to each other.

In one example, although not shown in the drawing, a first unevenness is formed on an inner face of the hole of the second gear 360. A second unevenness is formed on an outer face of the drive shaft 331. Thus, the first unevenness is engaged with the second unevenness so that the hole of the second gear 360 and the drive shaft 331 may be connected to each other in a tight manner.

In one example, referring to FIG. 5, M grooves 324 are formed on an inner face of the rotatable assembly 320, that is, an inner face of the accommodation structure 322. The M grooves 324 communicate with the M first receiving holes 323-1 respectively. Hereinafter, for convenience of description, following descriptions will be based on one groove and one second gear 350.

The second gear 350 is inserted into the groove 324. Accordingly, the second gear 350 is disposed in a top of the first receiving hole 323-1. Then, the drive shaft 331 of the motor 330 is received into the hole 351 of the second gear 360, and thus the second gear 360 and the drive shaft 331 are connected to each other.

A portion of the non-central region, that is, the outer edge of the second gear 360 disposed in the first receiving hole 323-1 protrudes outwardly of the groove 324. Therefore, a portion of the non-central region, that is, an outer edge of the fixed first gear 350 is engaged with a portion of the non-central region, that is, the outer edge of the rotatable second gear 360 which protruding outwardly of the groove 324.

In this connection, the drive shaft 331 of motor 330 rotates using the power stored in the battery 340. Therefore, the second gear 360 rotates. In this connection, since the first gear 350 is fixed to an outer face of the first through-hole 311, the second gear 360 rotates around the first through-hole 311. Accordingly, the rotatable assembly 320 is rotated.

The at least one bearing 370 supports a rotation axis of the rotatable assembly 320, and serves to reduce friction between the rotatable assembly 320 and the outer face of the first through-hole 311. The at least one bearing 370 is made of a conductive material and is fixedly arranged on the outer face of the first through-hole 311.

In this connection, the at least one bearing 370 may include a first bearing 370-1 disposed on a top of the outer face of the first through-hole 311 and a second bearing 370-2 disposed on a bottom of the outer face of the first through-hole 311.

In summary, the user-sensed weight reduction device 300 includes the rotatable assembly 320 receiving therein the M motors 330 and the N batteries 340. According to the rotation of the drive shaft 331 of the M motor 330, the M second gears 360 rotate around the fixed first gear 350. Accordingly, the rotatable assembly 320 rotates. The M motors 330 and N batteries 340 rotate according to the rotation of the rotatable assembly 320.

In this connection, an angular momentum occurs due to the rotation of the rotatable assembly 320 containing the M motors 330 and the N batteries 340 therein. Thus, an gyro effect is generated due to the generated angular momentum. The generated gyro effect reduces the user-sensed weight of the body of the wireless vacuum cleaner, particularly, the head portion as the top portion of the wireless vacuum cleaner. This is similar to a concept of a spinning top and a principle that a running bicycle does not fall down. Therefore, even a user with insufficient wrist strength may smoothly handle the wireless vacuum cleaner for a long time.

In one example, in the above embodiment, the drive shaft 331 of the motor 330 is formed on a top of the motor 331. According to another embodiment of the present disclosure, the drive shaft 331 of the motor 330 is formed on a bottom of the motor 331. In this case, the first gear 350 and the M second gears 360 and the M grooves 324 may be disposed or formed in a bottom of the rotatable assembly 320.

Hereinafter, with reference to FIG. 7, a configuration for connecting the N batteries 340 in series and a configuration for transmitting power stored in the N batteries 340 to the main battery will be described.

Figure 7:
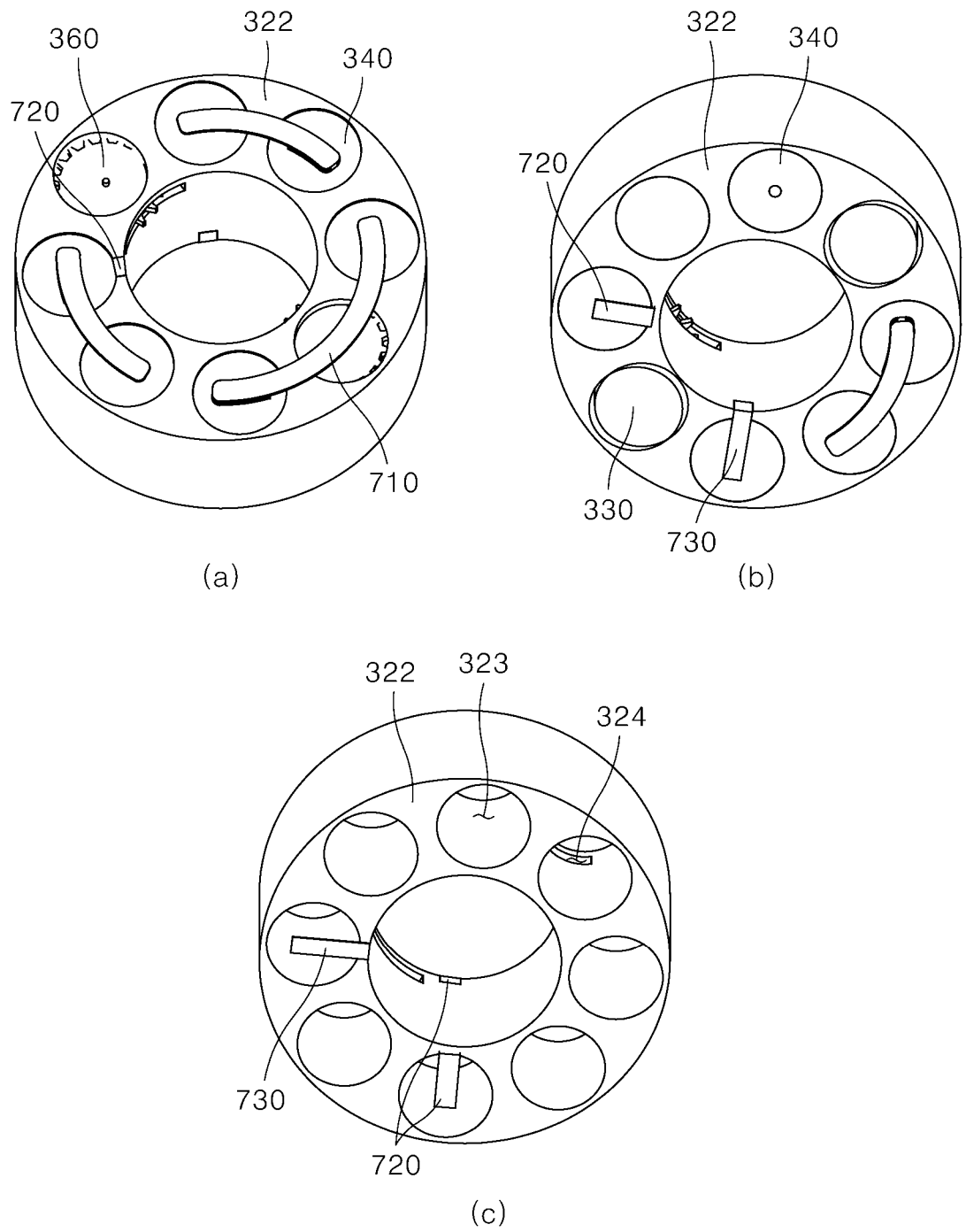
FIG. 7 is a diagram for describing a concept of an electrical connection between batteries in the device for reducing the user-sensed weight of the wireless vacuum cleaner in FIG. 3.

(a) in FIG. 7 shows a top perspective view of the rotatable assembly 320 containing the motors 330 and the batteries 340 therein. (b) of FIG. 7 shows a bottom perspective view of the rotatable assembly 320 containing the motors 330 and the batteries 340 therein. (c) in FIG. 7 shows a bottom perspective view of the rotatable assembly 320 into the motors 330 and the batteries 340 are not inserted.

Referring to FIG. 7, the user-sensed weight reduction device 300 includes at least one first metal plate 710, a second metal plate 720 and a third metal plate 730.

The at least one first metal plate 710 electrically connects the N batteries 340 to each other. That is, the N batteries 340 may be connected to each other in series via the at least one first metal plate 710.

For example, when a first battery and a second battery are disposed adjacent to each other, one end of the first metal plate 710 is electrically connected to an electrode of the first battery, and the other end of the first metal plate 710 is electrically connected to an electrode of the second battery. In this connection, the electrode of the first battery and the electrode of the second battery that are electrically connected to each other via the first metal plate 710 are flush with each other and have opposite polarities.

In an example, when the first battery having a (+) electrode as a bottom end and having a (−) electrode as a top end is adjacent to the second battery having a (−) electrode as a bottom end and having a (+) electrode as a top end, the first metal plate 710 may electrically connect the (+) electrode of the first battery and the (−) electrode of the second battery to each other, or may electrically connect the (−) electrode of the first battery and the (+) electrode of the second battery to each other.

The second metal plate 720 is disposed adjacent to a first one of the second receiving holes 323-2 into which a first battery 340 of the N batteries is inserted.

In this connection, when the at least one bearing 370 includes the first bearing 370-1 and the second bearing 370-2, one end of the second metal plate 720 is electrically connected to the first bearing 370-1, and the other end of the second metal plate 720 is connected to a bottom electrode of the first battery inserted in the first one of the second receiving holes 323-2.

The third metal plate 730 is disposed adjacent to a last one of the second receiving holes 323-2 into which a last battery 340 of the N batteries is inserted.

In this connection, when the at least one bearing 370 includes the first bearing 370-1 and the second bearing 370-2, one end of the third metal plate 730 is electrically connected to the second bearing 370-2, and the other end of the third metal plate 730 is connected to a top electrode of the last battery.

The first bearing 370-1 and the second bearing 370-2 made of the conductive material are connected to (+) and (−) electrodes of the main battery, respectively. Accordingly, power may be fed to the main battery.

In one example, the user-sensed weight reduction device 300 according to the first embodiment of the present disclosure has been described as a device included in the wireless vacuum cleaner. According to another embodiment of the present disclosure, the user-sensed weight reduction device 300 may be embodied as a device that is separate from the wireless vacuum cleaner.

That is, the wireless vacuum cleaner is equipped with a main battery. The user-sensed weight reduction device 300 may be a device storing the auxiliary battery 340 therein. The power stored in the auxiliary battery 340 may be supplied to the main battery.

Therefore, when using the user-sensed weight reduction device 300 according to the present disclosure, the user may handle the wireless vacuum cleaner for a long time.

Figure 8:
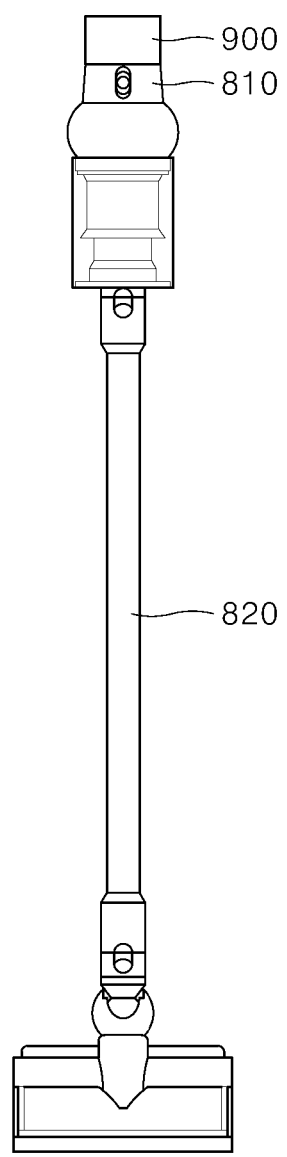
FIG. 8 is a view showing a state in which a user-sensed weight reduction device according to a second embodiment of the present disclosure is attached to a wireless vacuum cleaner.
Figure 9:
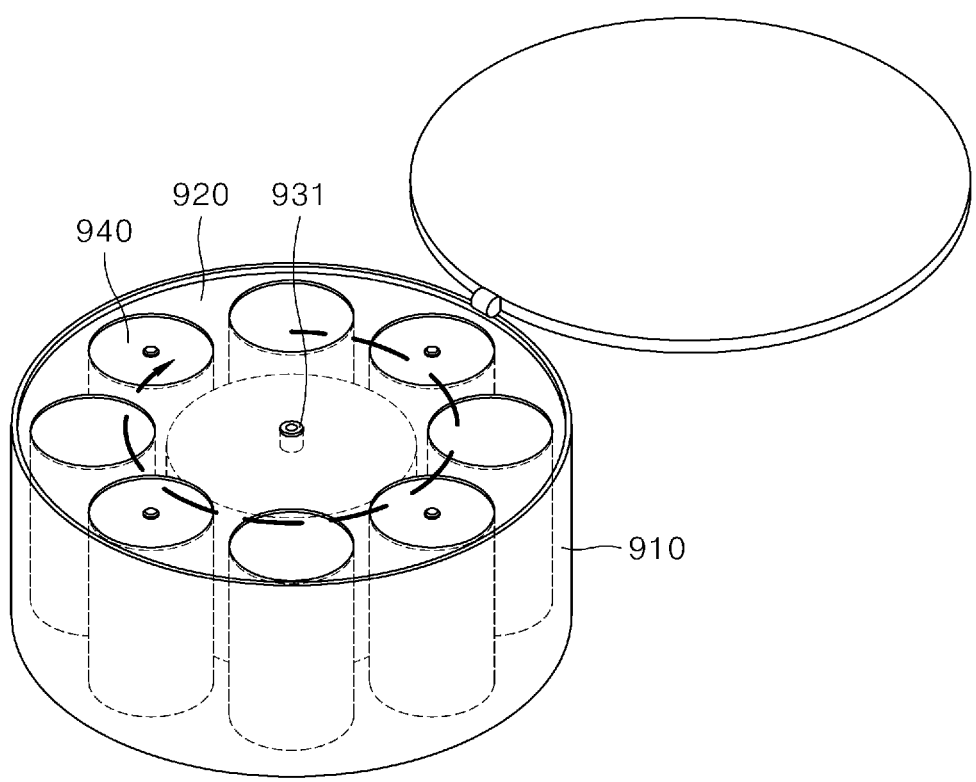
FIG. 9 is a perspective view of a user-sensed weight reduction device according to the second embodiment of the present disclosure.
Figure 10:
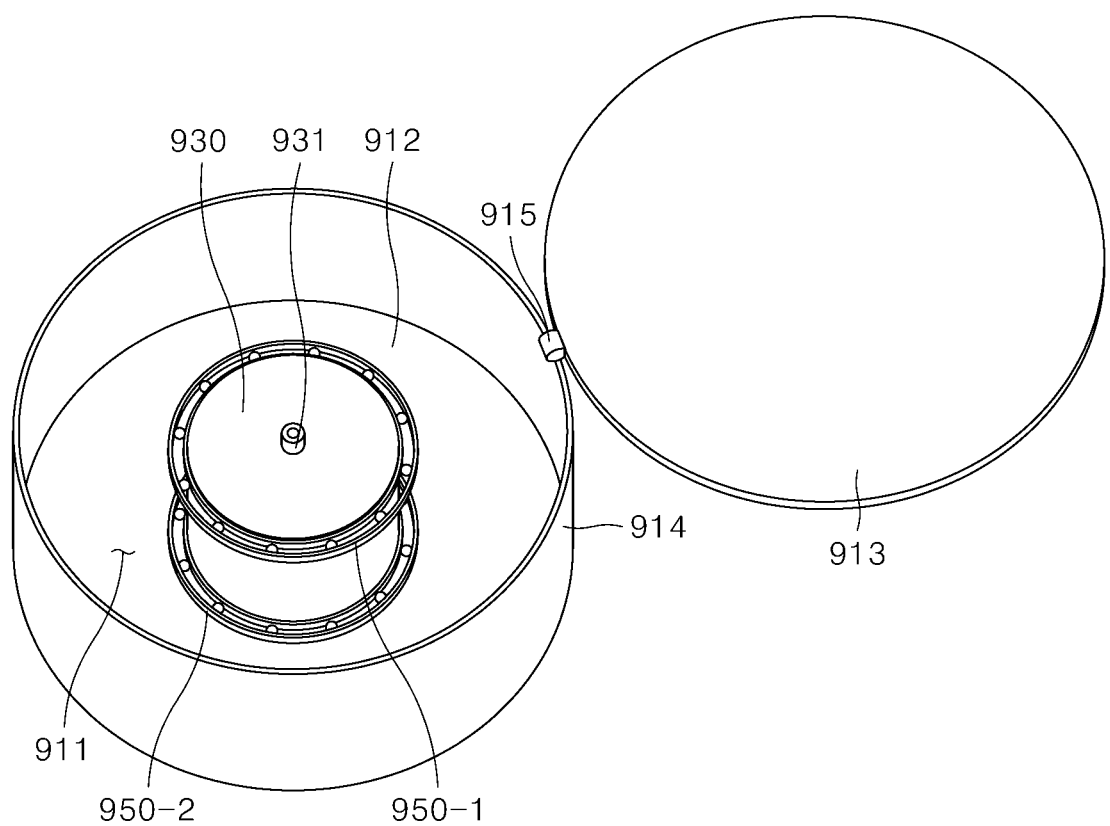
FIG. 10 shows a shape of a case of the device to reduce the user-sensed weight of the wireless vacuum cleaner in FIG. 9.
Figure 11:
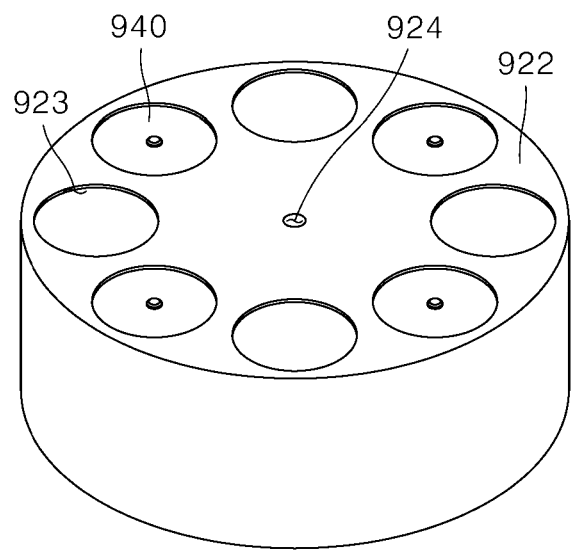
FIG. 11 shows a shape of a rotatable assembly of the device for reducing the user-sensed weight of the wireless vacuum cleaner in FIG. 9.
Figure 11:
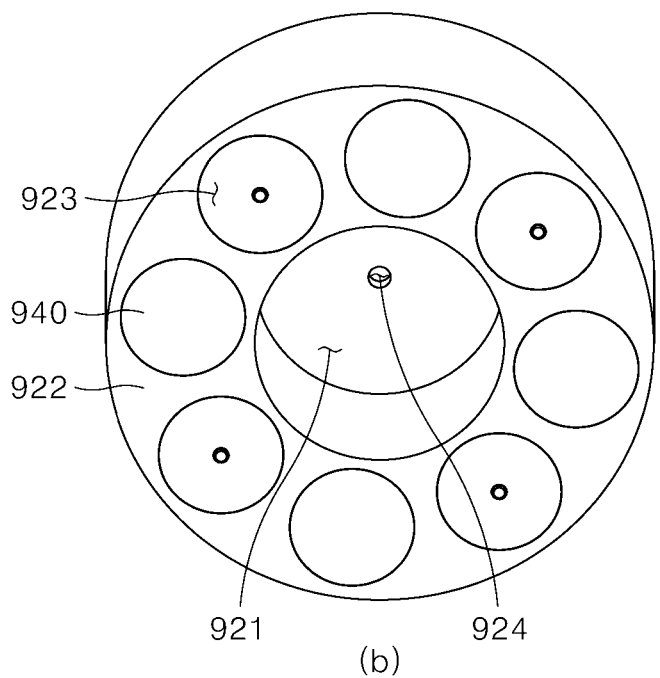

FIG. 8 is a view showing a state in which a user-sensed weight reduction device according to a second embodiment of the present disclosure is attached to a wireless vacuum cleaner. FIG. 9 is a perspective view of a user-sensed weight reduction device according to the second embodiment of the present disclosure. FIG. 10 shows a shape of a case of the device to reduce the user-sensed weight of the wireless vacuum cleaner in FIG. 9. FIG. 11 shows a shape of a rotatable assembly of the device for reducing the user-sensed weight of the wireless vacuum cleaner in FIG. 9.

A user-sensed weight reduction device 900 according to the second embodiment of the present disclosure may be a device included in the wireless vacuum cleaner in which a suction motor 810 is connected to a top of a suctioning pipe 820 as shown in FIG. 8. In this connection, the user-sensed weight reduction device 900 is disposed at a top of a head portion of the cleaner, i.e. adjacent to the suction motor 810.

Referring to FIG. 9 to FIG. 11, the user-sensed weight reduction device 900 includes a case 910, a rotatable assembly 920, a motor 930, at least one battery 940 and at least one bearing 950.

The case 910 is disposed adjacent to the suction motor 210. In an example, the case may be disposed on a top of the wireless vacuum cleaner.

The case 910 functions to protect other components of the user-sensed weight reduction device 300. The second space 911 is formed inside the case 910.

In particular, referring to FIG. 10, the case 910 includes a bottom 912, a cover 913 and a side wall 914. The bottom 912 defines a bottom face of the case 910. The cover 913 defines a top face of the case 910. The side wall 914 is disposed between the bottom 912 and the cover 914. The cover 912 connects to the side wall 914 via a hinge 915.

The rotatable assembly 920 is inserted and disposed in the second space 911, and performs a function of accommodating the motor 930 and the at least one battery 940 therein and rotates clockwise or counter-clockwise.

In particular, referring to FIG. 11, a first receiving hole 921 is formed in a center of the rotatable assembly 920. A non-central region thereof defines a accommodation structure 922 inserted into the second space 911. At least one second receiving hole 923 is formed in the accommodation structure 922.

The first receiving hole 921 acts as a space into which the motor 930 is inserted. The motor 930 may not completely pass through the first receiving hole 921. A drive shaft 931 is formed on a top of the motor 930. A hole 924 through which the drive shaft 931 passes is formed in a center of a top of the first receiving hole 921, that is, in a center of a top of the rotatable assembly 920. The drive shaft 931 is received into the hole 924. Accordingly, a face of the top of the rotatable assembly 920 is connected to the drive shaft 931.

In one example, although not shown in the drawing, a first unevenness is formed on an inner face of the hole 924. A second unevenness is formed on an outer face of the drive shaft 924. Thus, the first unevenness is engaged with the second unevenness so that the hole 924 and the drive shaft 920 may be connected to each other in a tight manner.

Each of the at least one battery 940 is inserted into each of the at least one second receiving hole 923. In this connection, each of the at least one second receiving hole 923 has a shape through which the battery 940 passes and thus is hollow.

Each of the at least one battery 940 stores electric power for charging the main battery inside the wireless vacuum cleaner. Moreover, the motor 930 may be driven by using power stored in the at least one battery 940.

According to the present disclosure, the drive shaft 931 of the motor 930 rotates using the power stored in the at least one battery 940. Thus, the face of the top of the rotatable assembly 920 connected to the rotating drive shaft 931 rotates. Therefore, the rotatable assembly 920 rotates.

The at least one bearing 950 supports a rotation axis of the rotatable assembly 320, and serves to reduce friction between the rotatable assembly 920 and the motor 930. The at least one bearing 370 may be made of a conductive material, and is fixedly arranged on the outer face of the motor 930.

In an example, the at least one bearing 950 includes a first bearing 950-1 disposed on a top of the outer face of the motor 930 and a second bearing 950-2 disposed on a bottom of the outer face of the motor 930.

In summary, the user-sensed weight reduction device 300 includes the rotatable assembly 920 containing the at least one battery 940 therein. The rotatable assembly 920 rotates according to the rotation of the drive shaft 931 of the motor 930. Thus, the at least one battery 940 rotates according to the rotation of the rotatable assembly 920.

In this connection, an angular momentum occurs due to the rotation of the rotatable assembly 920 in which the at least one battery 940 is contained. Thus, the gyro effect is generated due to the generated angular momentum. The generated gyro effect reduces the user-sensed weight of the head portion as the top portion of the wireless vacuum cleaner. Therefore, the user with insufficient wrist strength may handle the wireless vacuum cleaner smoothly for a long time.

In a similar manner to the user-sensed weight reduction device 300 according to the first embodiment of the present disclosure, the user-sensed weight reduction device 900 according to the second embodiment of the present disclosure may include at least one first metal plate, a second metal plate and a third metal plate, similar to those described in FIG. 7.

Therefore, the at least one battery 940 may be connected to each other in series. The power stored in the at least one battery 940 may be connected to the (+) electrode and (−) electrode of the main battery via the first bearing 950-1 and the second bearing 950-2, respectively. Accordingly, power may be fed to the main battery.

In one example, the user-sensed weight reduction device 900 according to the second embodiment of the present disclosure may be embodied as a single device separate from the wireless vacuum cleaner having the main battery. That is, the user-sensed weight reduction device 900 may be a device that accommodates the auxiliary battery 940.

As described above, the details such as the specific components and the like have been described based on the limited embodiments and drawings which are provided only to help overall understanding of the present disclosure. The present disclosure is limited to the above embodiments. Those skilled in the field to which the present disclosure belongs may perform various modifications and variations thereto. Therefore, the idea of the present disclosure should not be limited to the described embodiments. Not only the claims to be described later, but also all equivalents or modifications to the claims fall within a scope of the present disclosure.

What is claimed is:

1. A device for reducing a user-sensed weight of a wireless vacuum cleaner including a suctioning pipe and a suction motor disposed on a top of the suctioning pipe, the device comprising:
   a case having a first through-hole defined in a central region of the case through which the suctioning pipe passes and a first space defined in a non-central region of the case, and disposed adjacent to the suction motor; and
   a rotatable assembly received in the first space and having a second through-hole, M first receiving holes and N second receiving hole, wherein the second through-hole is defined in a central region of the rotatable assembly, the M first receiving holes and the N second receiving holes are defined in a non-central region of the rotatable assembly and each of M and N is an integer of 1 or greater,
   wherein each of M motors is received in each of the M first receiving holes,
   wherein each of N batteries is received in each of the N second receiving holes, and
   wherein the rotatable assembly is configured to rotate clockwise or counter-clockwise when the M motors are activated.

2. The device of claim 1, wherein an angular momentum occurs due to the rotation of the rotatable assembly, such that a user-sensed weight of a top portion of the wireless vacuum cleaner is reduced due to the generated angular momentum.

3. The device of claim 1, wherein the case includes:
a bottom defining a bottom face of the case and having a hollow central region;
a cover defining a top face of the case and having a hollow central region;
a side wall disposed between the bottom and the cover,
wherein the first space is defined by an outer face of the first through-hole, a top face of the bottom, a bottom face of the cover, and an inner face of the side wall.

4. The device of claim 1, wherein the device further comprises:
a first gear disposed on one of a top and a bottom of an outer face of the first through-hole; and
M second gears disposed in the M first receiving holes respectively, wherein the M second gears are flush with the first gear,
wherein each of the M second gears is rotatably coupled to a drive shaft of each of the M motors, wherein each shaft is flush with each second gear,
wherein the first gear is engaged with the M second gears,
wherein when each of the M second gears rotates around the first gear, the rotatable assembly rotates.

5. The device of claim 4, wherein the rotatable assembly has M grooves defined in an inner face of the rotatable assembly, wherein the M grooves communicate with the M first receiving holes, respectively,
wherein a portion of each of the M second gears protrudes through each of the M grooves out of the assembly and is engaged with the first gear.

6. The device of claim 1, wherein the device further comprises at least one bearing having one face in contact with the inner face of the rotatable assembly, and an opposite face contacting an outer face of the first through-hole.

7. The device of claim 6, wherein the device further comprises at least one first metal plate,
wherein one end of the first metal plate is electrically connected to an electrode of a first battery of the batteries, and the other end of the first metal plate is electrically connected to an electrode of a second battery adjacent to the first battery,
wherein the electrode of the first battery and the electrode of the second battery are flush with each other.

8. The device of claim 7, wherein a polarity of the electrode of the first battery and a polarity of the electrode of the second battery are opposite to each other.

9. The device of claim 7, wherein the device further comprises:
a second metal plate disposed adjacent to a first one of the N second receiving holes; and
a third metal plate disposed adjacent to a last one of the N second receiving holes,
wherein the at least one bearing includes:
a first bearing made of a conductive material and disposed on a top of the outer face of the first through-hole; and
a second bearing made of a conductive material and disposed on a bottom of the outer face of the first through-hole,
wherein one end of the second metal plate is electrically connected to the first bearing, and the other end of the second metal plate is connected to a bottom electrode of a battery inserted in the first one of the N second receiving holes,
wherein one end of the third metal plate is electrically connected to the second bearing, and the other end of the third metal plate is connected to a top electrode of the battery inserted in the last one.

* * * * *